US006788373B2

(12) United States Patent
Ito et al.

(10) Patent No.: US 6,788,373 B2
(45) Date of Patent: Sep. 7, 2004

(54) PROTECTIVE FILM FOR PROTECTING A DIELECTRIC LAYER OF A PLASMA DISPLAY PANEL FROM DISCHARGE, METHOD OF FORMING THE SAME, PLASMA DISPLAY PANEL AND METHOD OF MANUFACTURING THE SAME

(75) Inventors: Ken Ito, Tokyo (JP); Takeshi Kokura, Kagoshima (JP); Kentaro Ueda, Tokyo (JP); Toshiaki Hirano, Tokyo (JP)

(73) Assignee: NEC Corporation, Tokyo (JP)

( * ) Notice: Subject to any disclaimer, the term of this patent is extended or adjusted under 35 U.S.C. 154(b) by 164 days.

(21) Appl. No.: 09/904,556

(22) Filed: Jul. 16, 2001

(65) Prior Publication Data

US 2002/0008817 A1 Jan. 24, 2002

(30) Foreign Application Priority Data

Jul. 17, 2000 (JP) ........................................ 2000-216700

(51) Int. Cl.[7] ............................................ G02F 1/1333
(52) U.S. Cl. ........................... 349/122; 349/69; 349/70; 349/122; 349/125; 349/138; 349/140
(58) Field of Search ........................... 349/122, 69, 70, 349/125, 138, 140

(56) References Cited

U.S. PATENT DOCUMENTS

| | | | | | |
|---|---|---|---|---|---|
| 3,716,742 | A | * | 2/1973 | Nakayama et al. | 313/182 |
| 4,116,792 | A | * | 9/1978 | Byrum et al. | 204/192 |
| 4,258,080 | A | * | 3/1981 | Sonoda et al. | 427/82 |
| 4,794,308 | A | * | 12/1988 | Ernsthausen | 313/587 |
| 5,811,923 | A | * | 9/1998 | Zieba et al. | 313/479 |
| 5,993,543 | A | * | 11/1999 | Aoki et al. | 117/88 |
| 6,013,309 | A | * | 1/2000 | Kim et al. | 427/68 |
| 6,242,864 | B1 | * | 6/2001 | Nakahara et al. | 315/169.3 |
| 6,255,780 | B1 | * | 7/2001 | Komaki et al. | 313/586 |
| 6,344,080 | B1 | * | 2/2002 | Kim et al. | 106/287.23 |
| 6,379,783 | B1 | * | 4/2002 | Kim et al. | 428/210 |

FOREIGN PATENT DOCUMENTS

| JP | 9-295894 | 11/1997 |
|---|---|---|
| JP | 11-3665 | 1/1999 |

* cited by examiner

Primary Examiner—Allan R. Wilson
Assistant Examiner—Edgardo Ortiz
(74) Attorney, Agent, or Firm—Sughrue Mion, PLLC

(57) ABSTRACT

A protective film for protecting a dielectric layer of a plasma display panel from discharge contains a metallic oxide. A volume resistivity of the protective film is $3.5 \times 10^{11}$ Ω·cm or more.

17 Claims, 12 Drawing Sheets

PROTECTIVE FILM FOR PROTECTING A DIELECTRIC LAYER OF A PLASMA DISPLAY PANEL FROM DISCHARGE, METHOD OF FORMING THE SAME, PLASMA DISPLAY PANEL AND METHOD OF MANUFACTURING THE SAME

BACKGROUND OF THE INVENTION

1. Field of the Invention

The present invention relates to a protective film for protecting a dielectric layer of a plasma display panel from discharge, a method of forming the same, a plasma display panel and a method of manufacturing the same, and more particularly, to a protective film of which a discharge characteristic is improved, a method of forming the same, a plasma display panel and a method of manufacturing the same.

2. Description of the Related Art

Generally, a plasma display panel (PDP) has a thin structure, no flicker and a great display contrast ratio. Also, the PDP has a large number of features that it can be manufactured as a relatively large screen, its response speed is fast, a multicolor light emission is possible by using a fluorescent material because it is a spontaneous light emission type, and the like. Therefore, recently, the PDP has been widely used for the display device field related to the computer and the color image display field.

In the plasma display according to an operating method, there are AC driving type where electrodes are coated with a dielectric and operated indirectly in AC discharge state and DC driving type where electrodes are exposed to a discharge space and operated in DC discharge state. Further, in the AC driving type plasma display, there are a memory operating type to use memory of discharge cell as a driving method and a refresh operating type not to use it. And, brightness of the AC driving type plasma display is proportional to the number of discharge times. In case of the above refresh operating type, it is mainly used in the plasma display having small display capacity because brightness decreases when display capacity increases.

FIG. 1 is an exploded view schematically showing a structure of the AC driving memory operating type color plasma display.

In PDP, two isolation substrates 101 and 102 made of glass are provided. The isolation substrate 101 becomes a rear substrate, and the isolation substrate 102 becomes a front substrate.

On the isolation substrate 102, transparent electrodes 103 and 104 are provided on a face side opposite to the isolation substrate 101. The transparent electrodes 103 and 104 are extended in a horizontal direction (transverse direction) of the panel. Also, trace electrodes 105 and 106 are arranged to overlap the transparent electrodes 103 and 104, respectively. The trace electrodes 105 and 106 are made of, for example, metal material and provided in order to lower electrode resistance value between each electrode and external driving device. Further, there are formed a dielectric layer 112 covering the transparent electrodes 103 and 104, a plurality of black stripe layers 108 formed on the dielectric layer 112 and extended in a vertical direction (longitudinal direction) of the panel, color filter layers 110R, 110G and 110B of red color R, green color G and blue color B formed between the black stripe layers 108, and a protective film 114 for protecting the dielectric layer 112 and the transparent electrode 103 from discharge.

Also, because PDP emits each visible light of R, G and B by exciting the fluorescent material with emitted ultraviolet light, the color filter layers are not necessarily needed. The color filter layers are to collect spectrum of luminescent colors by the fluorescent material.

On the isolation substrate 101, data electrodes 107 perpendicular to the transparent electrodes 103 and 104 are provided on a face side opposite to the isolation substrate 102. Therefore, the data electrodes 107 are extended in the vertical direction. Further, a partition wall 109 is provided to divide a display cell in the horizontal direction. The partition wall 109 is opposite to the black stripe layers 108. Further, a dielectric layer 113 covering the data electrodes 107 is formed, and a fluorescent layer 111 to transform ultraviolet light generated by discharging of discharge gas into visible light is formed on a side surface of the partition wall 109 and a surface of the dielectric layer 113. Further, a discharge gas space is secured by means of the partition wall 109 in the space between the isolation substrates 101 and 102, and the discharge gas space is filled with a discharge gas consisting of helium, neon, xenon or mixture of gases thereof.

The protective film 114 is provided in order to protect the dielectric layer 112, the transparent electrode 103 and the like, from sputtering by ion bombardment during discharge as mentioned above, and because the protective film 114 comes in contact with the discharge gas space, its material and film quality affect greatly the discharge characteristic. Further, in AC driving type PDP, low consuming power, simplification of driving circuit, high precision and larger screen are important factors.

Therefore, generally, magnesium oxide MgO is used as a material of the protective film 114. MgO is an insulator having excellent sputtering resistance and a large secondary electron emission coefficient. The driving of PDP becomes possible with lowering discharge starting voltage by using MgO.

Subsequently, a conventional method of forming the protective film in the PDP will be described. The protective film is generally formed by a vacuum deposition method. FIG. 2 is a schematic diagram showing a conventional film forming apparatus of the protective film.

In the conventional film forming apparatus, a deposition chamber 121 is provided. In an upper part of the deposition chamber 121, a substrate 124 in which a dielectric layer, etc. have already been formed and MgO film is formed is mounted. Also, in lower part of the deposition chamber 121, a deposition source 125 composed of MgO as a raw material of the protective film is mounted. Further, in the deposition chamber 121, a heater 132 heating the substrate 124 and a gas inlet (not shown) for $O_2$ gas are formed.

In case of manufacturing the protective film using the conventional film forming apparatus configured as mentioned above, first, the substrate 124 is fixed in the upper part of the deposition chamber 121, and the substrate 124 is heated by the heater 132, and simultaneously, the deposition chamber 121 is exhausted. Subsequently, in order to arrange crystal orientation of MgO film, while oxygen gas is introduced into the deposition chamber 121, an electron beam 133 is irradiated to the deposition source 125 so that the MgO film is formed as the protective film on the opposite side to the deposition source 125 of the substrate 124.

Further, in order to improving an orientation property of the MgO film, the method of forming the MgO film in an atmosphere including hydrogen atom in excited or ionized state is disclosed (Japanese Patent Laid-Open No. Hei 9-295894 Publication).

Further, in order to lower a discharge voltage by improving the secondary electron emission coefficient of the protective film, the PDP in which an orientation of the protective film is in (n00) or (mm0) orientation and a surface roughness is 30 nm or more is disclosed (Japanese Patent Laid-Open No. Hei 11-3665 Publication).

However, in the display operation of the conventional AC memory operating type PDP, first, a discharge is generated in a discharge space by applying a discharge voltage pulse to the transparent electrodes 103 and 104. By this discharge, on the surface of the discharge space side of the protective film 114, a charge having opposite polarity to the polarities applied to each electrode is accumulated at the position where the transparent electrodes 103 and 104 face each other (wall charge forming step).

Then, a discharge is generated once more in the discharge space by applying a voltage having opposite polarity to the above discharge voltage pulse to the transparent electrodes 103 and 104. The accumulated charge (wall charge) is erased by this discharge so that the wall charge does not exist in the entire surface of PDP (erasing step of wall charge or erasing step).

Subsequently, the transparent electrode 103 is scanned by applying a predetermined voltage in turn, and a wall charge is accumulated as a preparation for displaying a light emitting cell by applying a predetermined voltage between the transparent electrode 103 in the voltage applying state and the data electrode 107 corresponding to a light emitting cell to be displayed out of the light emitting cells belonging to the transparent electrode 103 (writing step).

Next, an image display is performed by applying a sustaining discharge pulse voltage to the transparent electrodes 103 and 104 on the entire surface of PDP. And, because the voltage value of the sustaining discharge pulse voltage is set to be lower than that of discharge pulse voltage light emission is not generated, light emission does not occur in a light emitting cell in which the wall charge is not formed in the writing step, and light emission occurs only in a light emitting cell in which writing discharge is performed so that the image display is performed (display discharge step). In a gradation display, about 256 level display gradations are accomplished by combining in time series about eight kinds of sustaining discharge pulse groups of which the number of pulses is different according to the number of gradations (subfield gradation method).

FIGS. 3A and 3B are graphs showing the relationship between the applying voltage and discharge delay light emission in which an abscissa indicates the time and an ordinate indicates the light emission intensity and voltage. In the PDP, in case where there is no discharge delay, namely, light emission delay, because a discharge is started almost simultaneously in response to writing pulse applying start as shown in FIG. 3A, the light emission intensity characteristic having a very sharp peak is obtained. However, in case where there is discharge delay in each light emitting cell according to the secondary electron emission efficiency, each light emitting cell starts the discharge individually in response to the writing pulse applying start. Therefore, the peak of light emission intensity is lower and its width becomes wider than comparing with the case where there is no discharge delay, as shown in FIG. 3B. Further, all the light emitting cells do not start discharge simultaneously within the writing pulse applying time. Therefore, the light emitting cells in which writing is not still completed remain at the point of the writing pulse applying expiration time. Further, a portion indicated by a broken line in FIG. 3B shows an example of light emission intensity in case where the writing pulse is applied longer than the shown writing pulse period, and shows that the light emitting cells to be discharged cannot be discharged during applying the writing pulse, namely, the writing operating becomes incomplete. In this case, when the discharge delay is observed as light emission of the light emitting cell in the entire surface of the PDP, it is observed as flicker of screen display. Therefore, in case where the secondary electron emission efficiency of the protective film 114 (MgO film) is degraded, as shown in FIG. 3B, because the writing pulse applying time is shortened according to high precision and high gradation of the PDP, there is a problem that the discharge delay and writing operation becomes incomplete.

However, when the protective film formed by the conventional film forming method using the film forming apparatus shown in FIG. 2 is used, the forming time of writing discharge becomes longer so that writing badness that the discharge is not started within the defined time is easily occurred. Particularly, the discharge delay is long in the display cell, which becomes an isolation point in time and space, and in this case, a writing scan pulse width needs to be set longer. However, when the scan pulse width is set longer, there are problems that the number of sustaining pulses required for improving brightness is restricted and the driving by a dual scan to scan upper half part and lower half part of a screen individually is needed. In case of the dual scan, since the number of driving circuits is numerous comparing with a single scan, it is an obstacle to cut down cost. Further, since a crystal grain diameter is small in the conventional film forming method, there is a problem that the discharge starting voltage is high.

Further, in the film forming method described in Japanese Patent Laid-Open No. Hei 9-295894 Publication, the orientation property is improved, but orientation plane is not uniform. Therefore, there are some cases where sputtering resistance becomes insufficient. Further, the crystal grain diameter becomes small, and the discharge starting voltage becomes high. Similarly, in the PDP described in Japanese Patent Laid-Open No. Hei 11-3665 Publication, the sputtering resistance as a protective film is insufficient.

SUMMARY OF THE INVENTION

An object of the present invention is to provide a protective film for protecting a dielectric layer of a plasma display panel from discharge by which luminance can be improved, writing badness can be reduced and the number of driving circuits can be decreased by means of securing sufficient sputtering resistance and shortening a discharge delay time, a method of forming the same, a plasma display panel and a method of manufacturing the same.

According to one aspect of the present invention, a protective film protecting a dielectric layer of a plasma display panel from discharge contains metallic oxide. A volume resistivity of said protective film is $3.5 \times 10^{11}$ Ω·cm or more.

The protective film may contain 3 hydrogen atoms or more when the number of total atoms in the protective film is defined as 100.

According to another aspect of the present invention, a protective film protecting a dielectric layer of a plasma display panel from discharge contains metallic oxide and hydrogen. The number of hydrogen atoms is 3 or more when the number of total atoms in the protective film is defined as 100.

In the present invention, the volume resistivity and/or the hydrogen atom content of the protective film are defined.

The inventors of the present invention found that the volume resistivity and hydrogen atom content are closely related to the discharge delay time of writing and discharge voltage in the PDP, and with defining them in an appropriate range, shortening of discharge delay time, lowering of discharge voltage and improvement of brightness are attained.

The metallic oxide may be MgO. A peak of light emission intensity of light emitting center in 510 to 560 nm in a cathode luminescence may be higher than that of light emission intensity of light emitting center in 280 to 440 nm or 680 to 760 nm. Further, the number of the hydrogen atoms may be at least the number of total deficits of total oxygen atoms and metal atoms. The protective film may be formed by means of performing a heat treatment in atmosphere including hydrogen in excited or ionized state. A surface roughness Ra of the protective film may be 5 nm or more. It is preferable that the protective film has (111) orientation. In case where a protective film shows (111) orientation, high sputtering resistance can be obtained.

According to another aspect of the present invention, a method of forming a protective film protecting a dielectric layer of a plasma display panel from discharge, comprises the steps of: forming a metallic oxide film; and performing a heat treatment of said metallic oxide film in atmosphere including hydrogen in excited or ionized state.

According to another aspect of the present invention, a method of forming a protective film protecting a dielectric layer of a plasma display panel from discharge, comprises the step of forming a film containing a metallic oxide while performing a heat treatment in atmosphere including hydrogen in excited or ionized state.

According to another aspect of the present invention, a method of manufacturing a plasma display panel, comprises the step of forming a protective film by the above-described method.

According to the present invention, since the volume resistivity and the hydrogen atom content closely related to the discharge delay time of writing and the discharge voltage, etc. in the PDP are properly defined, the discharge delay time can be shortened. As a result, the luminance can be improved, the writing badness can be prevented, and simultaneously, the number of driving circuits can be reduced, and the cost can be lowered. Further, consuming power can be reduced by means of lowering the driving voltage (discharge voltage).

DETAILED DESCRIPTION OF THE PREFERRED EMBODIMENTS

As a result of repeating experimental study in order to solve the above-mentioned problems, the inventors of the present invention found that the discharge delay time can be shortened by means of defining a volume resistivity or a hydrogen content of a protective film in a predetermined range. Further, when an orientation of the protective film is (111) orientation, the best sputtering resistance can be accomplished.

Hereinafter, a protective film according to the present invention will be described in detail. First, the volume resistivity and the hydrogen content of the protective film will be explained.

Volume resistivity: $3.5 \times 10^{11}$ $\Omega \cdot cm$ or more

Figure 4:
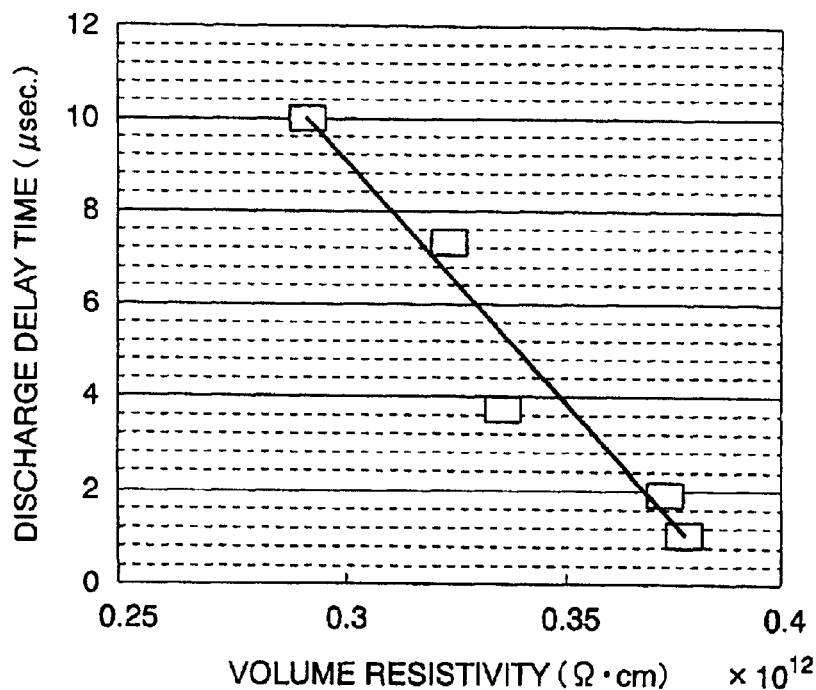
FIG. 4 is a graph showing the relationship between the volume resistivity and the discharge delay time.
Figure 4:
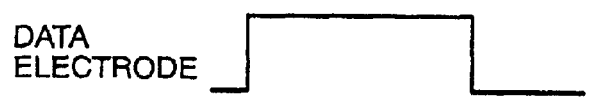

As a result of study on the relationship between the volume resistivity and the discharge delay time conducted by the inventors of the present invention, the following relationship was found. FIG. 4 is a graph showing the relationship between the both in which an abscissa indicates the volume resistivity and an ordinate indicates the discharge delay time.

As shown in FIG. 4, as the volume resistivity is increased, the discharge delay time is shortened. The discharge delay time depends on a driving method and a shape of a discharge cell of PDP. Also, an allowable range of the discharge delay time depends on the number of scan lines and a driving method. In the PDP used when obtaining the graph shown in FIG. 4, when the discharge delay time becomes about 4 $\mu s$ or more, the writing discharge is not generated within the applying time of the writing pulse so that flicker is generated by the writing badness. Further, because the scan pulse width needs to be set longer, the number of sustaining pulses is restricted so that it is difficult to obtain sufficient luminance. However, in case where the discharge delay time is not more than 4 µs, sufficient luminance can be obtained because the scan pulse corresponding to the width as much as restricting the number of sustaining pulses is not needed. Further, in case where the discharge delay time is not more than 1.8 µs, the number of driving circuits can be reduced because it is possible to secure the sufficient scan period by the single scan.

Figure 5A:
FIG. 5A is a timing chart showing the applying pulse.
Figure 5B:
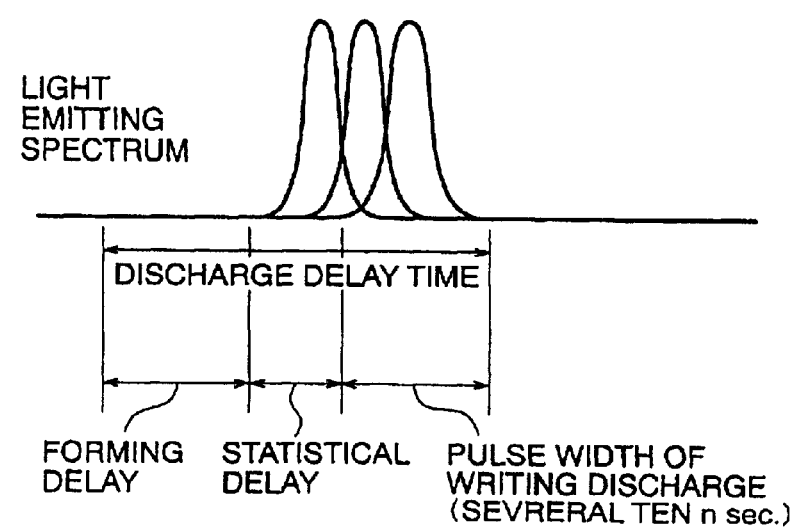
FIG. 5B is a schematic diagram showing the light emitting spectrum obtained by discharge.
Figure 6:
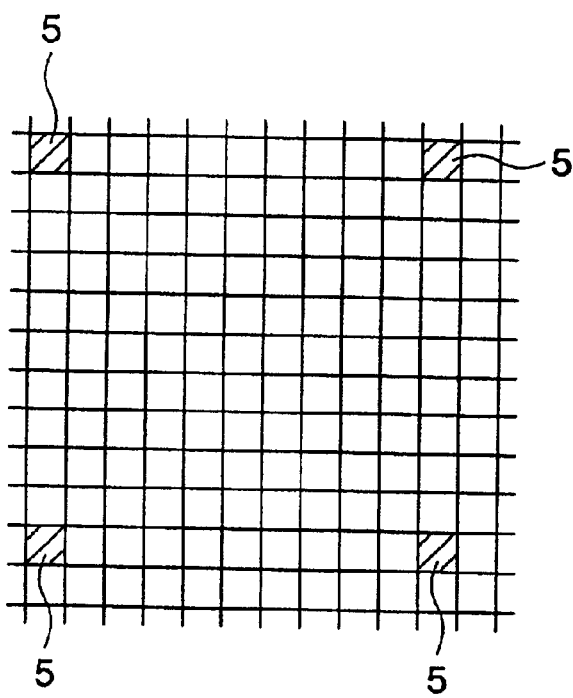
FIG. 6 is a schematic diagram showing the discharging part in measuring discharge delay time.

In measuring the discharge delay time, a PDP was actually assembled, and the discharge delay time was measured every 10 display cells lengthwise and crosswise as an isolation point which is not affected by discharge in other adjacent display cell. FIG. 5A is a timing chart showing the applying pulse, FIG. 5B is a schematic diagram showing the light emitting spectrum obtained by discharge, and FIG. 6 is a schematic diagram showing the discharge place in measuring discharge delay time. The discharge was simultaneously generated in display cells 5 indicated by hatching in FIG. 6.

As shown in FIG. 5A, when generating the discharge, a pulse of −195V was applied to a scanning electrode, a voltage of 70V was applied to a data electrode, and the above-described experiment was performed 2000 times with respect to one display cell. As a result, as shown in FIG. 5B, some discrepancies occur in the light emitting spectrums, but in this measurement, the discharge delay time was defined as the time from the pulse applying time to the time when the light emitting spectrum is decreased to 10% of the peak value in the discharge which reached the peak value lastly.

The above-mentioned tendency obtained by such measurement method is not changed although the driving method, the shape of discharge cell or the like is changed. However, the numerical value of the discharge delay time is different according to the driving method and the shape of discharge cell.

Accordingly, the volume resistivity of the protective film is defined as $3.5 \times 10^{11}$ Ω·cm or more.

Further, the discharge delay is composed of the sum of a statistical delay and a forming delay from a viewpoint of the discharge phenomenon. Out of the statistical delay and the forming delay, the delay changed by the volume resistivity of MgO is only the statistical delay. Accordingly, even in case where the statistical delay time is shortened by increase of the volume resistivity, the discharge delay time becomes gradually close to the forming delay time and saturated. In the PDP used when obtaining the graph shown in FIG. 4, because the forming delay time was about 1 µs, it is supposed from FIG. 4 that the statistical delay time became about 0 µs when the volume resistivity became $0.4 \times 10^{12}$ Ω·cm. However, the statistical delay time is changed, for example, by the applying voltage besides the volume resistivity. In other words, in case where the applying voltage is lowered, the statistical delay time is increased. Accordingly, it is preferable that the volume resistivity is $0.4 \times 10^{12}$ Ω·cm or more in order to be able to drive by the even lower applying voltage.

Figure 7:
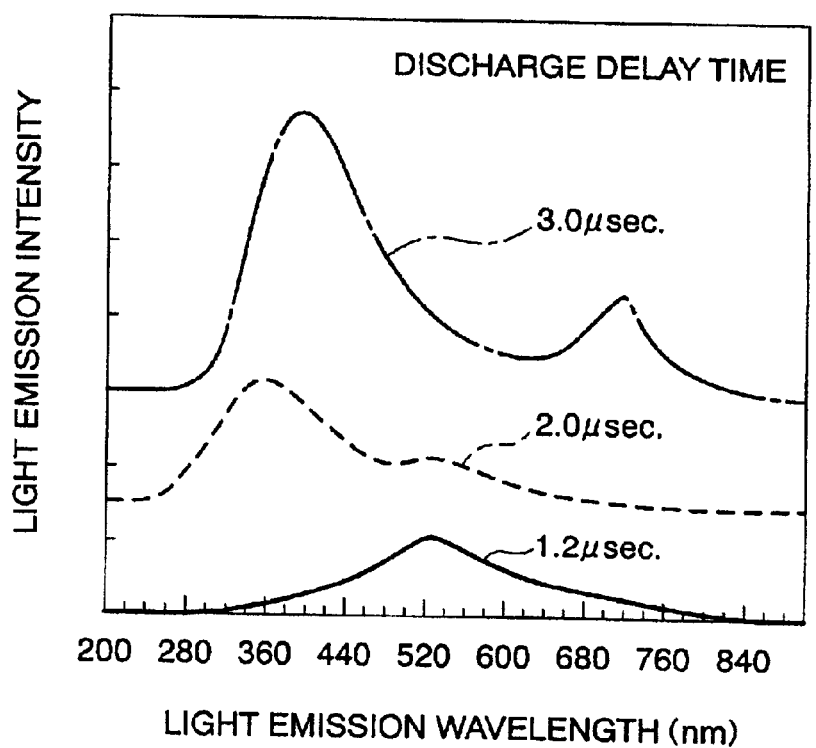
FIG. 7 is a graph showing the relationship between the light emitting wavelength and light emission intensity by the cathode luminescence in the samples of which discharge delay time is different.

Also, as a result of study on the relationship between the light emitting center and the discharge delay time by measuring the cathode luminescence of MgO film conducted by the inventors of the present invention, the following relationship was found. FIG. 7 is a graph showing the relationship between the both in which an abscissa indicates the light emitting wavelength and an ordinate indicates the light emission intensity. Further, in FIG. 7, a solid line indicates the light emission intensity in PDP where the discharge delay time is 1.2 µs, a broken line indicates the light emission intensity in PDP where the discharge delay time is 2.0 µs, and a dashed chain line indicates the light emission intensity in PDP where the discharge delay time is 3.0 µs. The light emission intensity has significance in the relative value in each curved line, and the absolute value has no particular meaning.

As shown in FIG. 7, in PDP where the discharge delay time is 1.2 µs (the solid line), the peak of the light emission intensity appears at only the light emitting wavelength of about 520 nm.

Meanwhile, in PDP where the discharge delay time is 2.0 µs (the broken line), the peak of the light emission intensity appears at the light emitting wavelengths of about 520 nm and 360 nm, and the peak is greater at the light emitting wavelength of about 360 nm.

Further, in PDP where the discharge delay time is 3.0 µs (the dashed chain line), the peak of the light emission intensity appears at the light emitting wavelengths of about 400 nm and 730 nm, and the peak is greater at the light emitting wavelength of about 400 nm.

According to the literature "M. O. Aboelfotoh: Binn. Display Res. Conf. Records. P62 (1978)", it is described that an absorption wavelength peak at the light emitting wavelength of 360 nm to 400 nm is a peak called F+ center caused by oxygen deficit, an absorption peak at the light emitting wavelength of about 520 nm is a peak caused by exciton, and an absorption peak at the light emitting wavelength of about 730 nm is a peak caused by excessive oxygen.

Therefore, it is thought that in the panel where the discharge delay time is short, defect caused by oxygen deficit and excessive oxygen is decreased. From this result, it is preferable that in the cathode luminescence, the peak of light emission intensity of light emitting center in 510 to 560 nm is higher than that of light emission intensity of light emitting center in 280 to 440 nm or 680 to 760 nm. At this time, it is thought that the number of hydrogen atoms in the protective film is included not less than the number of total deficits of oxygen atom and metal atom in the protective film.

Further, the cathode luminescence is an analysis method of obtaining information on the defect and the like of a sample by detecting the light emission as an energy relief process when an electron beam was irradiated to the sample. In the cathode luminescence herein, a PDP was assembled once, and the discharge delay time was measured by the above method, and then, the PDP was disassembled, and the electron beam was directly irradiated to the protective film, thereby detecting the light emission.

Figure 8:
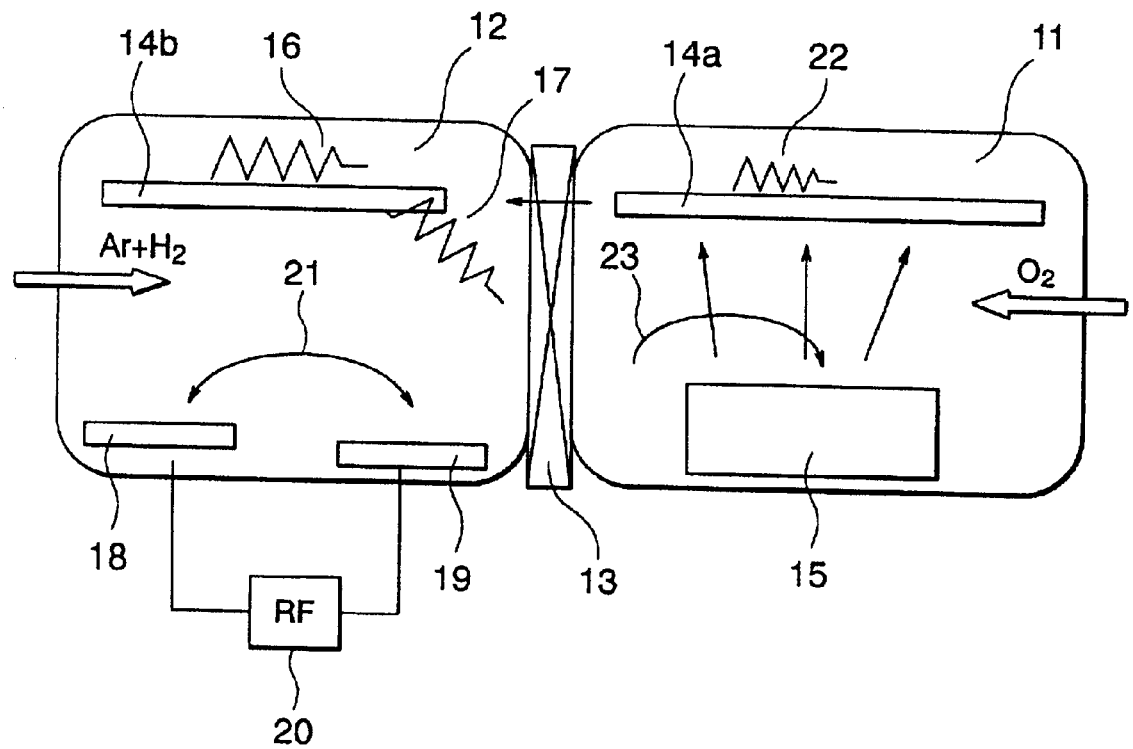
FIG. 8 is a schematic diagram showing a first film forming apparatus used in manufacturing a protective film.

Next, the method of manufacturing the protective film including the above-mentioned volume resistivity will be described. FIG. 8 is a schematic diagram showing a first film forming apparatus used in manufacturing the protective film.

In the first film forming apparatus, a deposition chamber 11 and a hydrogen treatment chamber 12 partitioned by a gate valve 13 are provided.

In an upper part of the deposition chamber 11, a substrate 14a to which a dielectric layer and the like have been already formed and MgO film is to be formed is mounted. In a lower part of the deposition chamber 11, a deposition source 15 composed of MgO as a raw material of the protective film is mounted. Further, in the deposition chamber 11, a heater 22 heating the substrate 14a and a gas inlet (not shown) for $O_2$ gas are provided.

Meanwhile, in an upper part of the hydrogen treatment chamber 12, a substrate 14b to which an MgO film has been formed is mounted. In the hydrogen treatment chamber 12, a heater 16 heating the substrate 14b and a heater 17 heating the inside of the chamber 12 are provided. In a lower part of the hydrogen treatment chamber 12, electrodes 18 and 19 connected to an external high frequency power supply (RF) 20 are arranged, and a discharge 21 is generated between the electrodes 18 and 19. Further, in the hydrogen treatment chamber 12, a gas inlet (not shown) for Ar gas and $H_2$ gas is provided.

In case of manufacturing a protective film using the first film forming apparatus configured as mentioned above, first, the substrate 14a is fixed in the upper part of the deposition chamber 11. Subsequently, the substrate 14a is heated, for example, at 230 to 270° C. by the heater 22, and at the same time, the deposition chamber 11 is exhausted until a degree of vacuum reaches about $8 \times 10^{-4}$ Pa. Next, in order to arrange the crystal orientation of MgO film, while the oxygen gas is introduced into the deposition chamber 11 at the flow rate of 30 to 80 ml/min. (standard state), an electron beam 23 is irradiated to the deposition source 15 so that MgO film of 5000 to 10000 Å is formed on a face opposite to the deposition source 15 of the substrate 14a. Also, the substrate 14b to which an MgO film has been formed is moved into the hydrogen treatment chamber 12 by opening the gate valve 13.

Subsequently, in the hydrogen treatment chamber 12, the substrate 14b and inside of the hydrogen treatment chamber 12 are heated, for example, at 230 to 270° C. by the heaters 16 and 17, respectively. Further, the hydrogen chamber 12 is exhausted until the degree of vacuum becomes about $5 \times 10^{-4}$ to $9 \times 10^{-4}$ Pa, and after the degree of vacuum reaches about $5 \times 10^{-4}$ to $9 \times 10^{-4}$ Pa, Ar gas is introduced with controlling pressure such that the degree of vacuum becomes about $2.1 \times 10^{-1}$ Pa. Subsequently, while hydrogen gas is introduced at the flow rate of 30 to 80 ml/min. (standard state), the discharge 21 is generated in the hydrogen treatment chamber 12 with applying the high frequency of, for example, 13.56 MHz to the electrodes 18 and 19 by means of the high frequency power supply 20. And, a plasma is generated by means of exciting the hydrogen atom by the discharge 21, and the MgO film formed on the substrate 14b is exposed to the excited hydrogen, for example, for 8 to 12 minutes to perform the hydrogen treatment of the MgO film.

Figure 9:
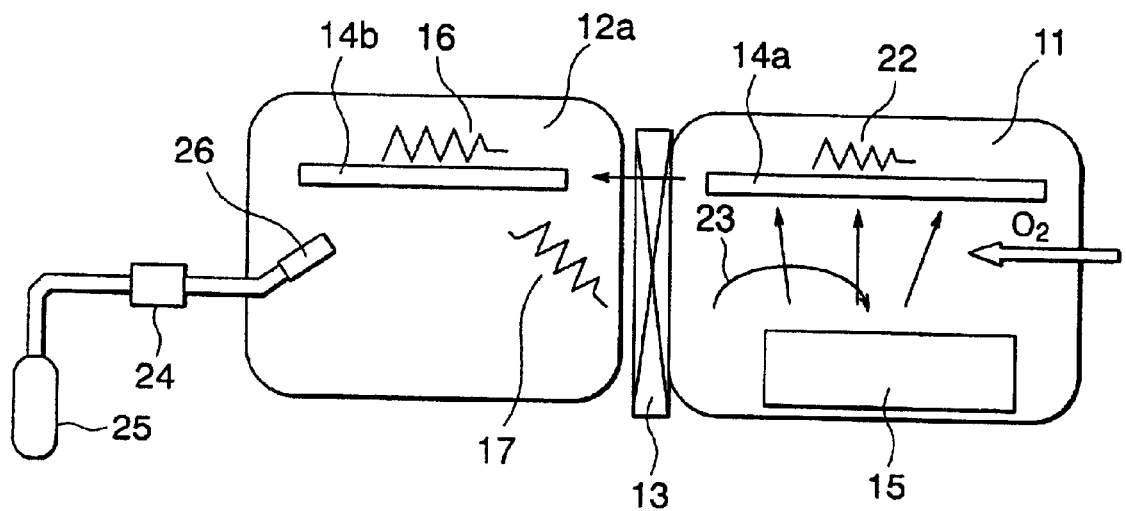
FIG. 9 is a schematic diagram showing a second film forming apparatus used in manufacturing a protective film.

FIG. 9 is a schematic diagram showing a second film forming apparatus used in manufacturing the protective film.

Even in the second film forming apparatus, a deposition chamber 11 and a hydrogen treatment chamber 12a partitioned by the gate valve 13 are provided. Because a structure of the deposition chamber 11 is the same as that of the first film forming apparatus, the detailed explanation thereof will be omitted.

In the hydrogen treatment chamber 12a, a hydrogen ion generator is provided instead of a plasma generator such as the high frequency power supply 20. Specifically, an ion gun 26 irradiating ions toward the substrate 14b is provided in the hydrogen treatment chamber 12a. The ion gun 26 is connected to a hydrogen cylinder 25 through Mass Flow Controller (MFC) 24 provided in the outside of the hydrogen treatment chamber 12a.

In case of manufacturing the protective film using the second film forming apparatus configured as mentioned above, an MgO film is formed by the same method as the case using the first film forming apparatus, and the substrate 14b to which the MgO film has been formed is moved into the hydrogen treatment chamber 12.

Subsequently, in the hydrogen treatment chamber 12, the substrate 14b and the inside of the hydrogen treatment chamber 12 are heated, for example, at 230 to 270° C. by the heaters 16 and 17, respectively.

Further, the hydrogen treatment chamber 12 is exhausted, and after the degree of vacuum reaches $8 \times 10^{-4}$ Pa, hydrogen ion from the ion gun 26 is irradiated to the MgO film formed on the substrate 14b to perform the hydrogen treatment of the MgO film. The flow rate of the hydrogen is defined as 20 to 100 ml/min.

Figure 10:
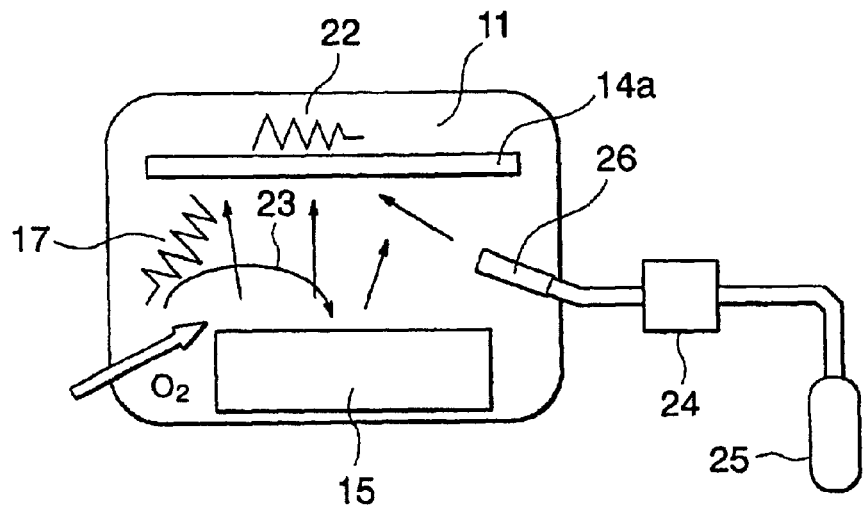
FIG. 10 is a schematic diagram showing a third film forming apparatus used in manufacturing a protective film.

FIG. 10 is a schematic diagram showing a third film forming apparatus used in manufacturing the protective film.

The third film forming apparatus has a structure in which the hydrogen treatment chamber 12a seems to be integrated with the deposition chamber 11 in the second film forming apparatus.

Namely, the hydrogen treatment chamber 12a is not provided, and the heater 17 and the ion gun 26 are provided in the deposition chamber 11.

In case of manufacturing the protective film using the third film forming apparatus configured as mentioned above, the substrate 14a and the inside of the deposition chamber 11 are heated, for example, at 200 to 270° C. by the heaters 22 and 17, respectively, the degree of vacuum is set to $2.7 \times 10^{-2}$ Pa, oxygen gas and hydrogen gas are introduced at the flow rate of 35 to 70 ml/min. (standard state) and 10 to 30 ml/min. (standard state), respectively, and the electron beam 23 is irradiated to the deposition source 15, thereby forming a MgO film at the rate of 80 Å/sec. Further, at the same time, hydrogen ion is irradiated to the MgO film to be formed on the substrate 14b by means of the ion gun 26 to perform the hydrogen treatment of the MgO film. At this time, the flow rate of the hydrogen may be 20 to 100 ml/min.

Hydrogen content: 3 or more atoms when the number of total atoms of the protective film is defined as 100

Figure 11:
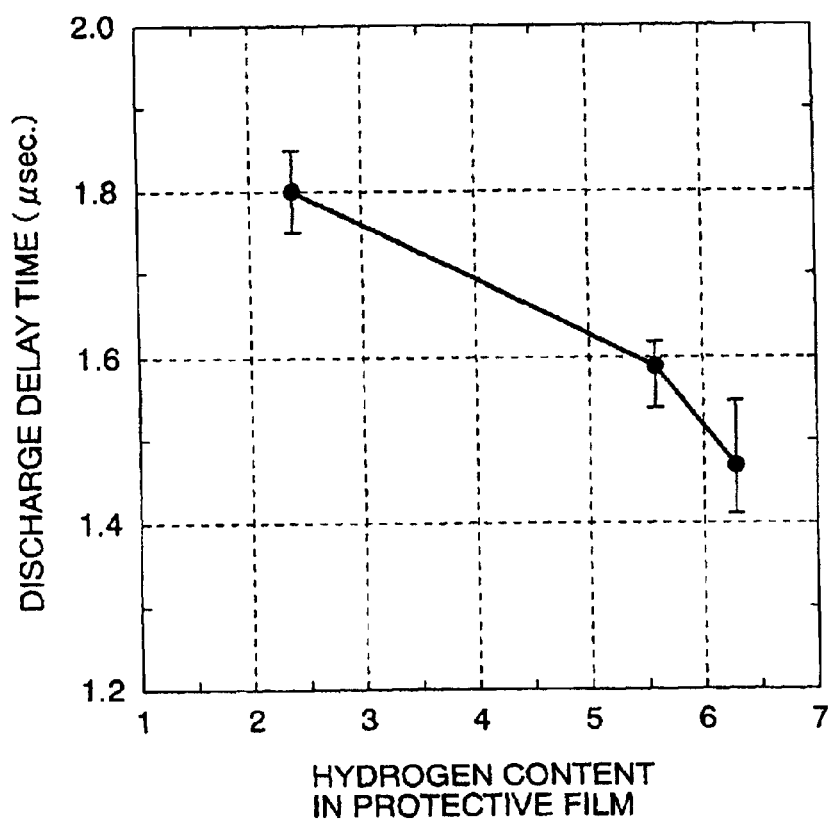
FIG. 11 is a graph showing the relationship between the hydrogen content and the discharge delay time.

As a result of study on the relationship between the hydrogen content and the discharge delay time conducted by the inventors of the present invention, the following relationship was found. FIG. 11 is a graph showing the relationship between the both in which an abscissa indicates the hydrogen content (the number of hydrogen atoms when the number of total atoms of the protective film is defined as 100) and an ordinate indicates the discharge delay time.

As shown in FIG. 11, as the hydrogen content is increased, the discharge delay time is shortened. As mentioned above, the discharge delay time depends on the driving method of PDP, the shape of discharge cell and the like. Further, an allowable range of the discharge delay time depends on the number of scan lines and the driving method. In the PDP used when obtaining the graph shown in FIG. 11, when the discharge delay time becomes about 1.8 $\mu$s or more, the dual scan of PDP is required for securing the scan period. Further, since the scan pulse width needs to be set longer, the number of sustaining pulses is restricted so that it is difficult to obtain sufficient luminance. In this regard, when the discharge delay time is less than 1.8 $\mu$s, the number of driving circuits can be decreased because it is possible to secure the sufficient scan period by the single scan. Further, because the scan pulse corresponding to the width as much as restricting the number of sustaining pulses is not needed, sufficient luminance can be obtained.

Figure 12:
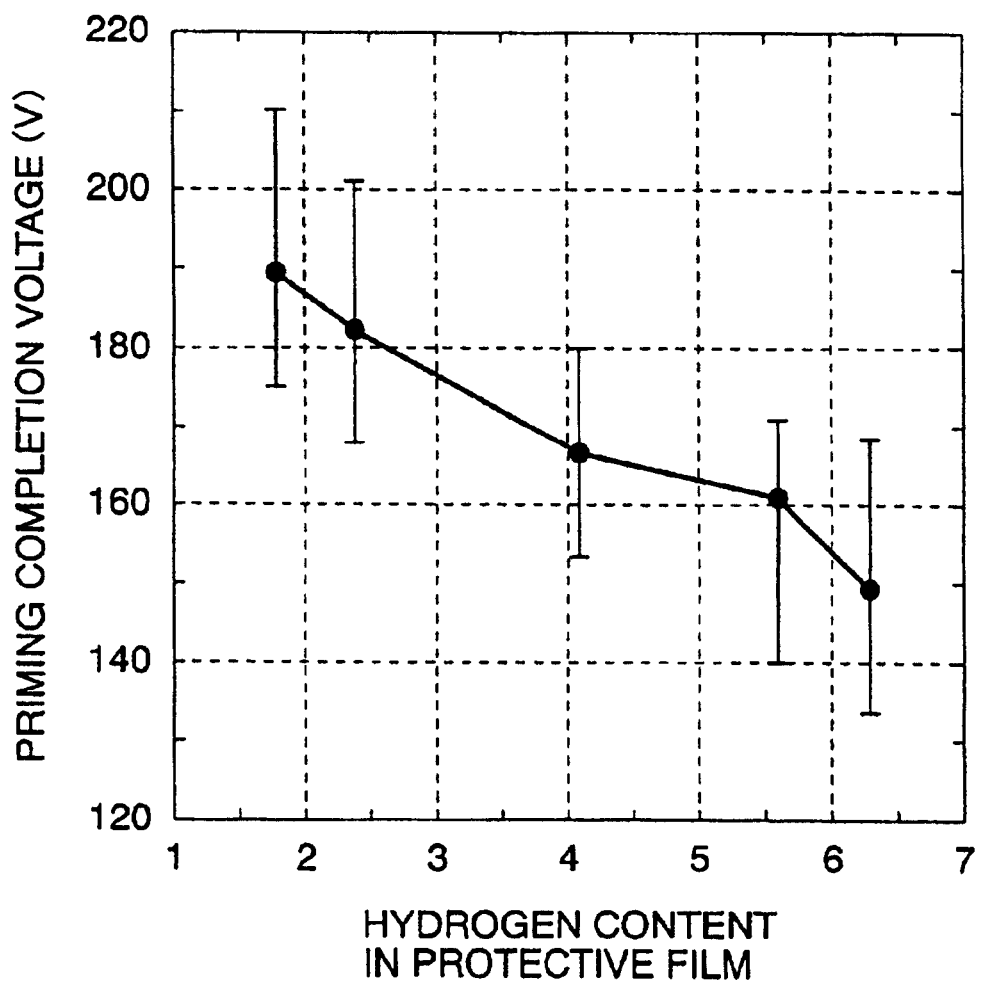
FIG. 12 is a graph showing the relationship between the hydrogen content and the priming voltage.

Further, the inventors of the present invention found the following relationship with respect to the relationship between the hydrogen content and the priming completion voltage. FIG. 12 is a graph showing the relationship between the both in which an abscissa indicates the hydrogen content (the number of hydrogen atoms when the number of total atoms of the protective film is defined as 100) and an ordinate indicates the priming completion voltage. The priming completion voltage herein means the lowest voltage that the priming voltage is uniformly formed in the PDP display plane without generating the writing badness and the error lighting. The lower the priming setting voltage is, the more the display contrast is improved, but when the priming setting voltage becomes close to the completion voltage, the writing badness and the error lighting are easily occurred. Accordingly, 20 to 50V higher voltage than the conventional priming completion voltage is set for the priming setting voltage. Practically, in the PDP used when obtaining the graph shown in FIG. 11, when the priming completion voltage is 180V or more and the priming voltage is not more than 200V, incidence rate of the writing badness and the error lighting was increased.

The priming setting voltage used when obtaining the graph shown in FIG. 11 is measured by setting 20 to 50V higher voltage than the priming completion voltage. As such, in case where the priming setting voltage is set with an enough margin with respect to the priming completion voltage, the discharge delay time does not depend on the priming setting voltage.

Such a tendency is not changed although the driving method or the shape of discharge cell is changed.

Accordingly, the hydrogen content is defined as 3 atoms or more when the number of total atoms of the protective film is defined as 100.

However, when the hydrogen content exceeds 10 atoms when the number of total atoms of the protective film is defined as 100, the defect in the protective film and the magnesium hydroxide content may be increased. Therefore, the sputtering resistance as the protective film is degraded. Thus, it is preferable that the hydrogen content is not more than 10 atoms when the number of total atoms of the protective film is defined as 100.

Further, as a result of study on the relationship of the discharge delay time and the discharge voltage, and the surface roughness Ra conducted by the inventors of the present invention, it was found that when the surface roughness Ra is 5 nm or more, the discharge delay time is shortened, and simultaneously, the discharge voltage is lowered because an electric field effectively applied to the surface of the protective film is remarkably increased. Accordingly, it is preferable that the surface roughness Ra of the protective film is 5 nm or more.

Next, the method of manufacturing the protective film having the above-mentioned hydrogen content and the surface roughness will be explained.

Figure 1:
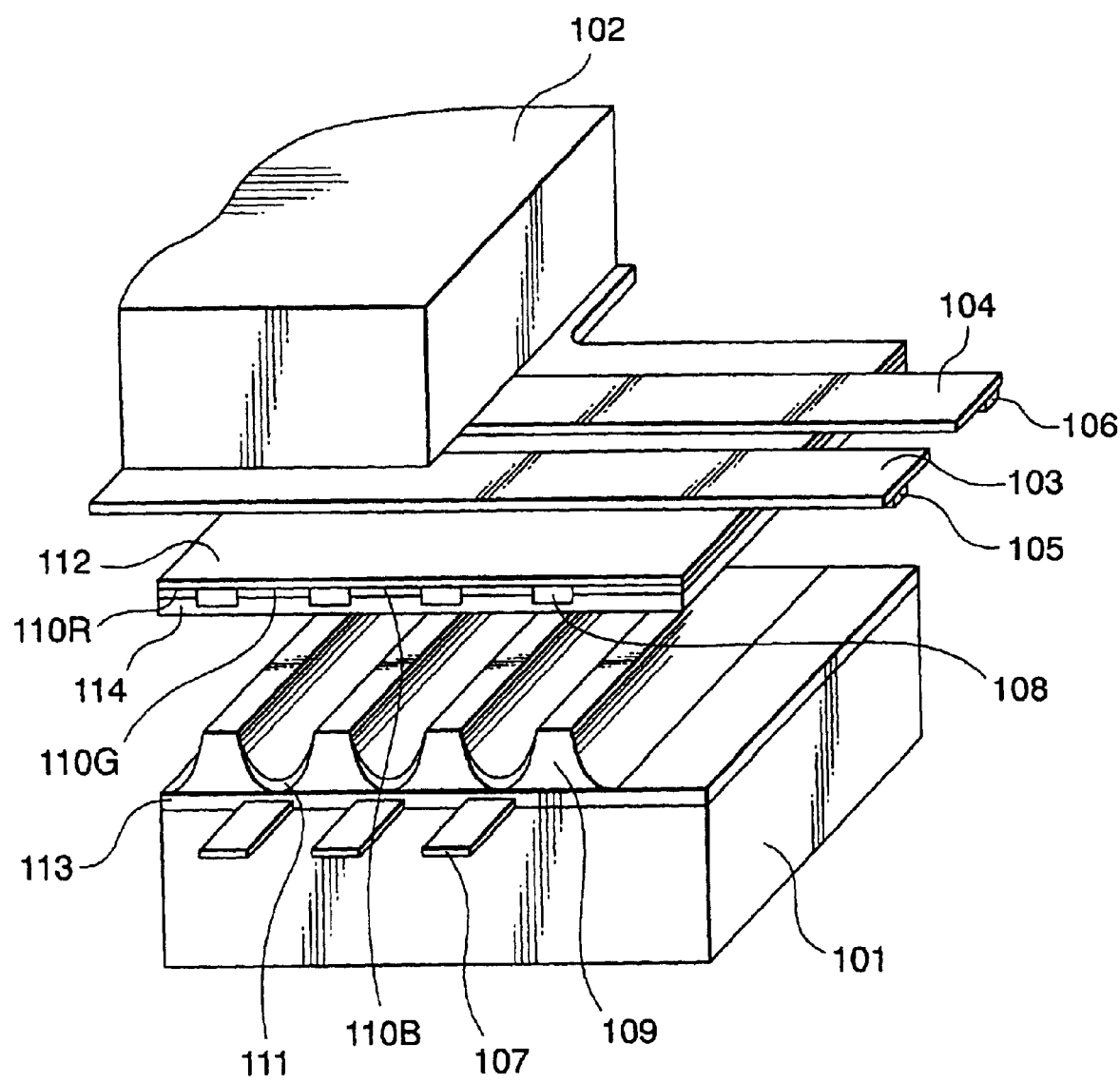
FIG. 1 is an exploded view schematically showing a structure of the AC driving memory operating type color plasma display.
Figure 2:
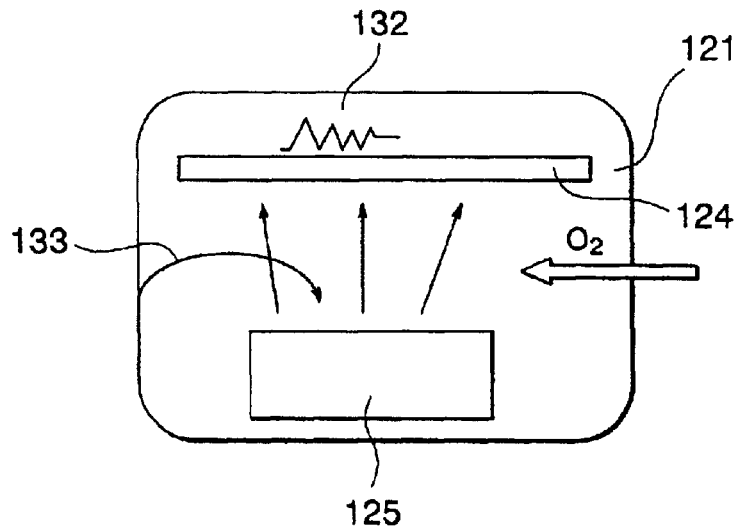
FIG. 2 is a schematic diagram showing the conventional film forming apparatus of protective film.
Figure 3A:
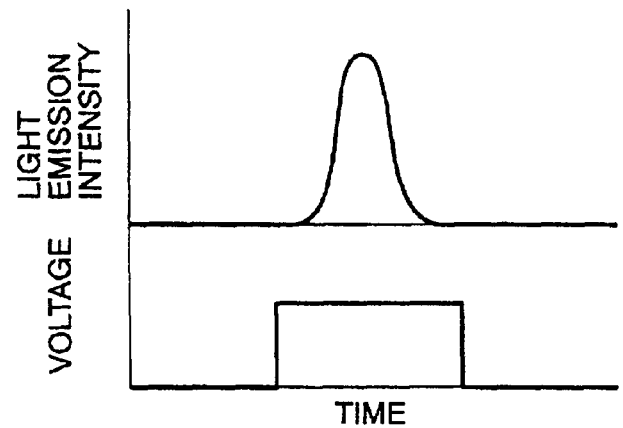
FIG. 3A and FIG. 3B are graphs showing the relationship between the applying voltage and the discharge delay light emission in which an abscissa indicates is the time and an ordinate indicates the light emission intensity and voltage.
Figure 3B:
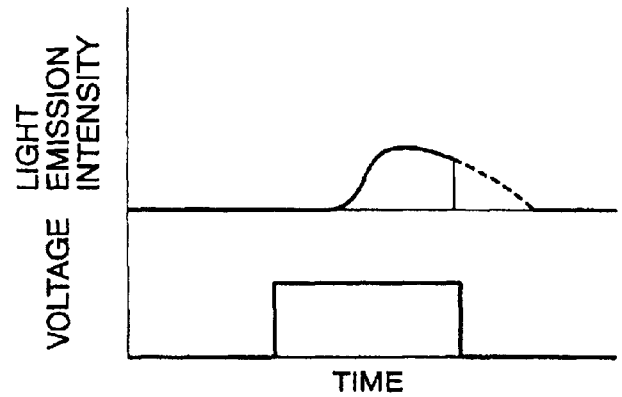

Such a protective film can be manufactured using, for example, the conventional film forming apparatus shown in FIG. 2 or the above-described first through third film forming apparatus. For instance, when the protective film having 5000 to 15000 Å is formed with making the pressure within the chamber $2.0 \times 10^{-2}$ to $4.0 \times 10^{-2}$ Pa, the partial pressure ratio of hydrogen and oxygen 0.3 to 1 in the atmosphere within the chamber, the substrate temperature 150 to 250° C. and the deposition rate 1000 to 2000 Å/min., the hydrogen content of the protective film becomes 3 to 10 atoms when the number of total atoms of the protective film is defined as 100, and the surface roughness Ra thereof becomes 5 nm or more.

Under the condition such as the above-mentioned pressure in the chamber, in order to examine the influence on the hydrogen content by changing only the partial pressure ratio of hydrogen and oxygen, a signal height was measured by ERDA (Elastic Recoil Detection Analysis) method with respect to the number of H atoms which exist in the protective film, and a signal height was measured by RBS (Rutherford Back-scattering Spectrum) method with respect to the number of Mg atoms and 0 atoms. The detection angle is inclined to the axis of the incident beam by 140° in the RBS method, and the detection angle is inclined to the axis of the incident beam by 20° in the ERDA method. Similarly, in order to examine the influence on the surface roughness Ra of the protective film by changing the ratio of the number of hydrogen atoms with respect to the number of oxygen atoms, the surface roughness Ra was measured by using AFM (Atomic Force Microscopy).

Figure 13A:
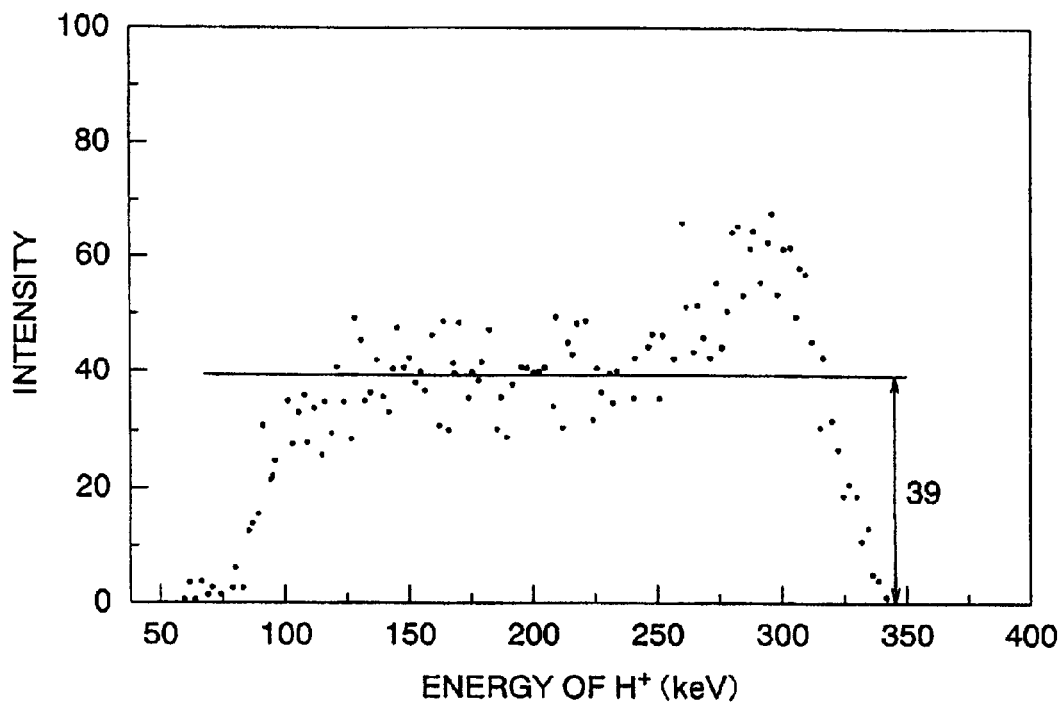
FIG. 13A and FIG. 13B are graphs showing the spectrums of H atom and Mg atom in case where the partial pressure ratio of hydrogen and oxygen is 0.5 in an atmosphere within the chamber.
Figure 13B:
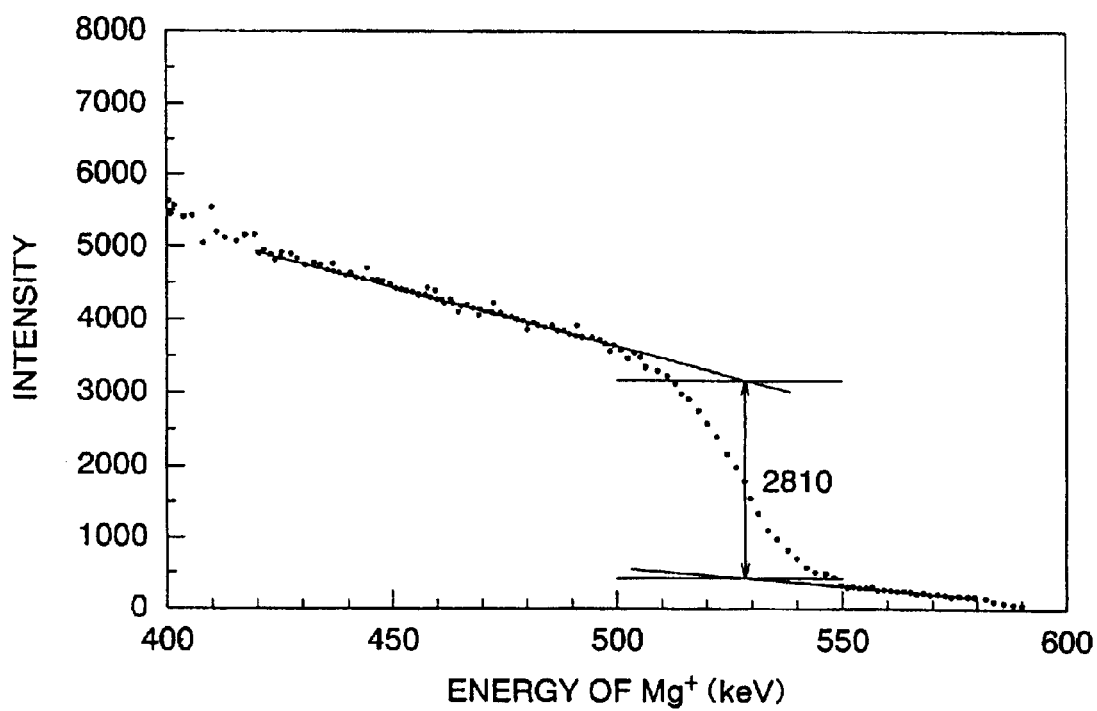
Figure 14A:
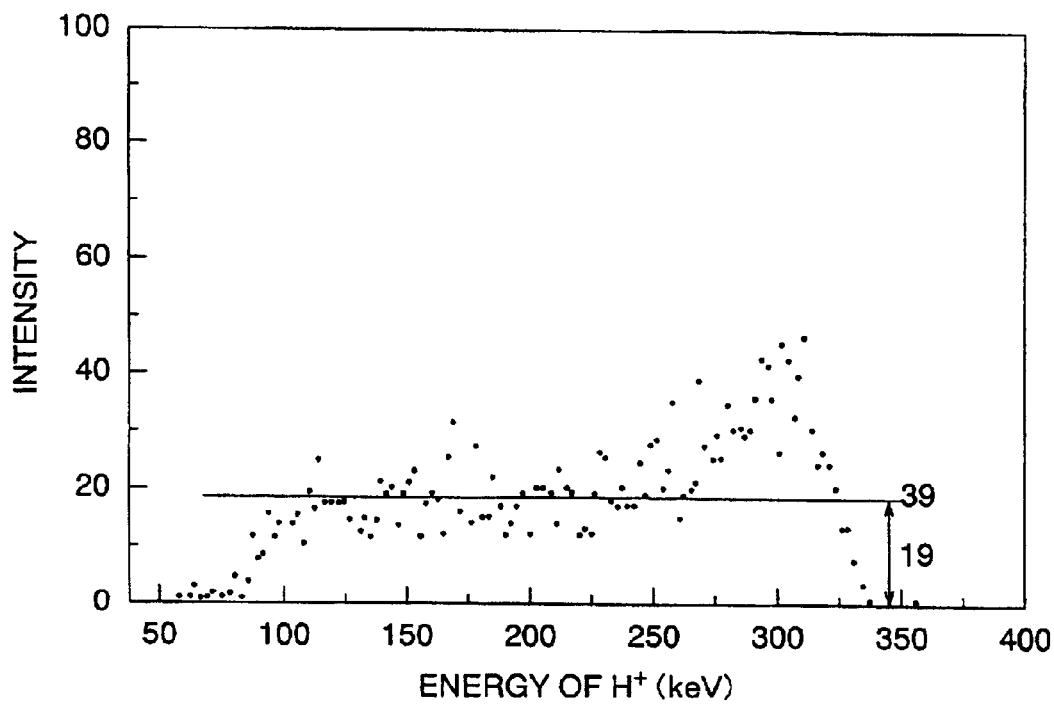
FIG. 14A and FIG. 14B are graphs showing the spectrums of H atom and Mg atom in case where the partial pressure ratio of hydrogen and oxygen is 0.2 in the atmosphere within the chamber.
Figure 14B:
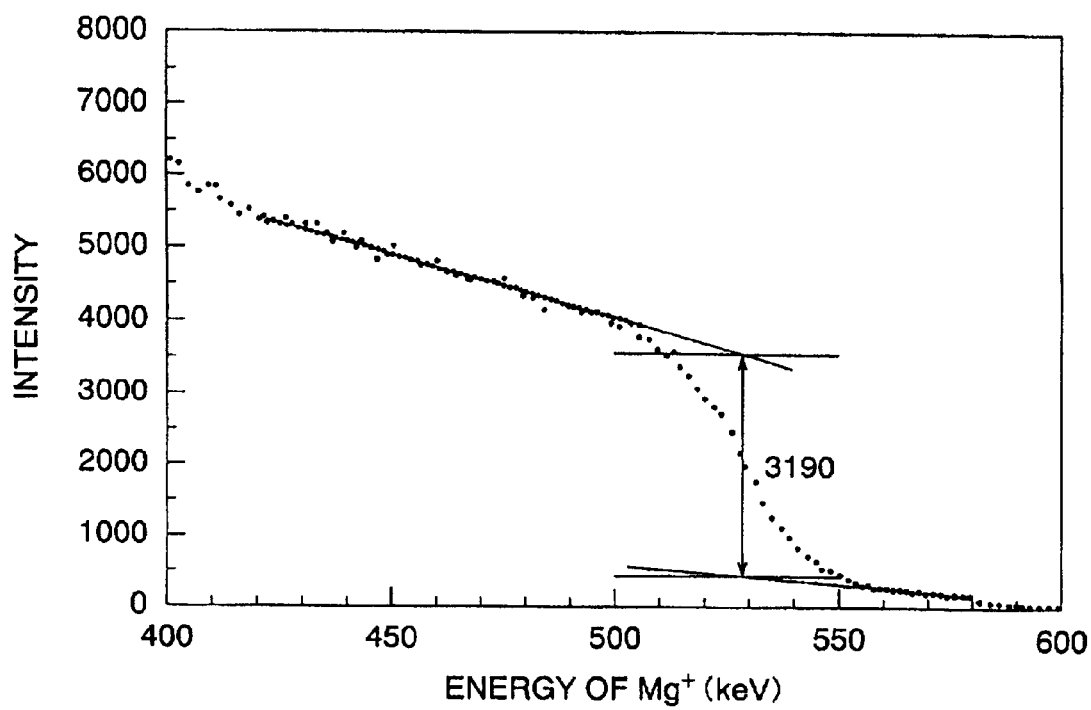

FIG. 13A is a graph showing the spectrum of H atom in case where the partial pressure ratio of hydrogen and oxygen is 0.5 in the atmosphere within the chamber, and FIG. 13B is a graph showing the spectrum of Mg atom in case where the partial pressure ratio of hydrogen and oxygen is 0.5 in the atmosphere within the chamber. FIG. 14A is a graph showing the spectrum of H atom in case where the partial pressure ratio of hydrogen and oxygen is 0.2 in the atmosphere within the chamber, and FIG. 14B is a graph showing the spectrum of Mg atom in case where the partial pressure ratio of hydrogen and oxygen is 0.2 in the atmosphere within the chamber.

In case where the partial pressure ratio of hydrogen and oxygen is 0.5, as shown in FIG. 13A and FIG. 13B, the signal height of H atom became 39, and the signal height of Mg atom became 2810. Accordingly, in the number of atoms in this case, the H/Mg ratio in the protective film becomes 0.13. Meanwhile, in case where the partial pressure ratio of hydrogen and oxygen is 0.2, as shown in FIG. 14A and FIG. 14B, the signal height of H atom became 19, and the signal height of Mg atom became 3190. Accordingly, in the number of atoms in this case, the H/Mg ratio in the protective film becomes 0.05.

Further, according to the results separately measured by the RBS method, in case where the partial pressure ratio of hydrogen and oxygen is 0.5, the O/Mg ratio in the protective film was 1.20 in the number of atoms, and in case where the partial pressure ratio of hydrogen and oxygen is 0.2, the O/Mg ratio in the protective film was 1.02 in the number of atoms.

From these results, in case where the partial pressure ratio of hydrogen and oxygen is 0.5, the hydrogen content of the protective film becomes 5.6 when the number of total atoms of the protective film is defined as 100, and in case where the partial pressure ratio of hydrogen and oxygen is 0.2, the hydrogen content thereof becomes 2.4.

Figure 15:
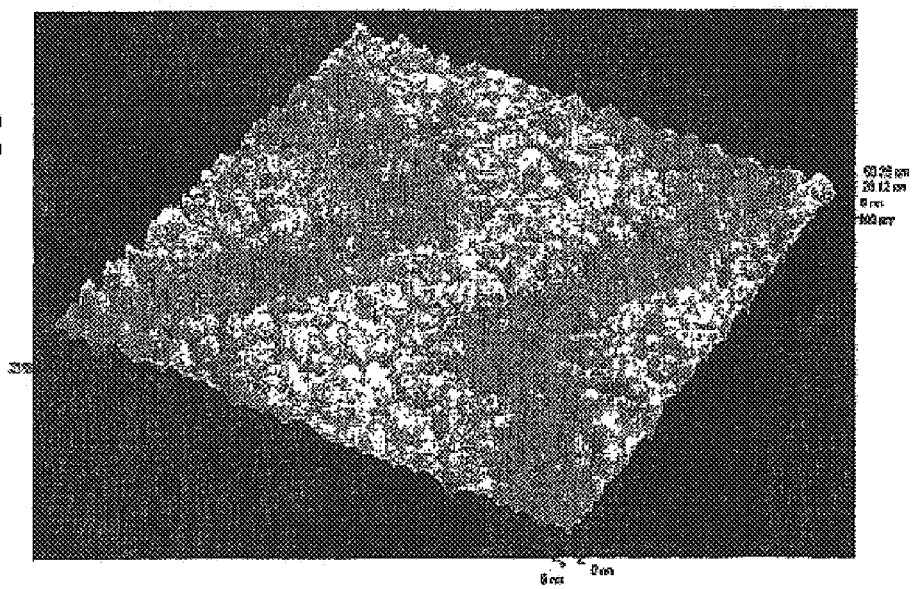
FIG. 15 is a microphotograph showing the surface shape of the protective film in case where the partial pressure ratio of hydrogen and oxygen is 0.5 in the atmosphere within the chamber.
Figure 16:
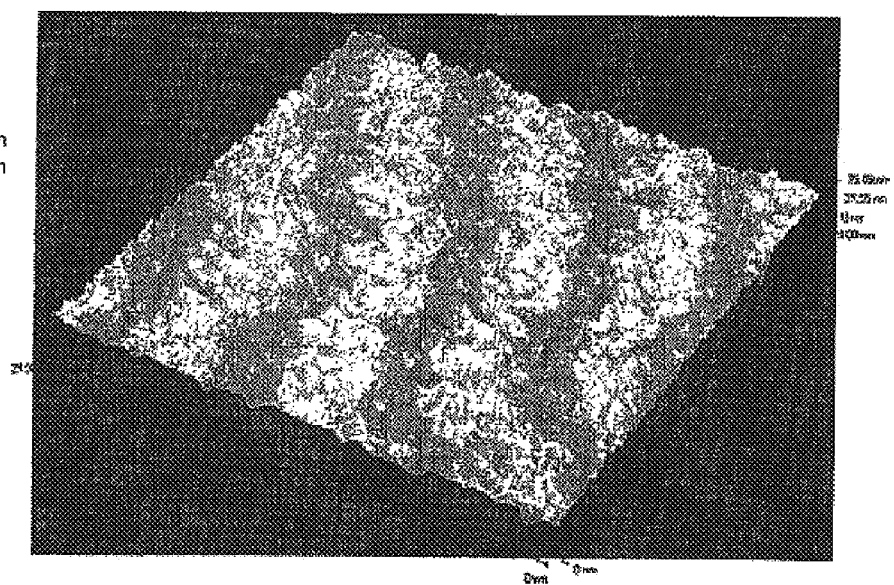
FIG. 16 is a microphotograph showing the surface shape of the protective film in case where the partial pressure ratio of hydrogen and oxygen is 0.2 in the atmosphere within the chamber.

FIG. 15 is a microphotograph showing the surface shape of the protective film in case where the partial pressure ratio of hydrogen and oxygen is 0.5 in the atmosphere within the chamber, and FIG. 16 is a microphotograph showing the surface shape of the protective film in case where the partial pressure ratio of hydrogen and oxygen is 0.2 in the atmosphere within the chamber.

As a result of measuring the surface roughness Ra of the protective film by using the atomic force microscopy, in case where the partial pressure ratio of hydrogen and oxygen is 0.5 in the atmosphere within the chamber, Ra was 5.43 nm, and in case where the partial pressure ratio of hydrogen and oxygen was 0.2 in the atmosphere within the chamber, Ra was 4.97 nm.

Figure 17:
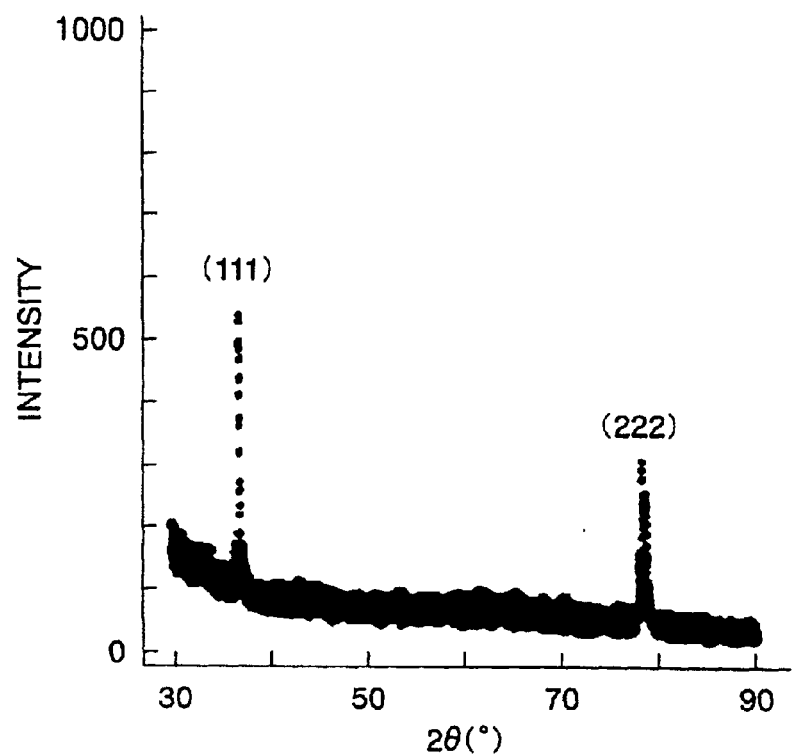
FIG. 17 shows the result of X-ray diffraction in case where the partial pressure ratio of hydrogen and oxygen is 0.5 in the atmosphere within the chamber.
Figure 18:
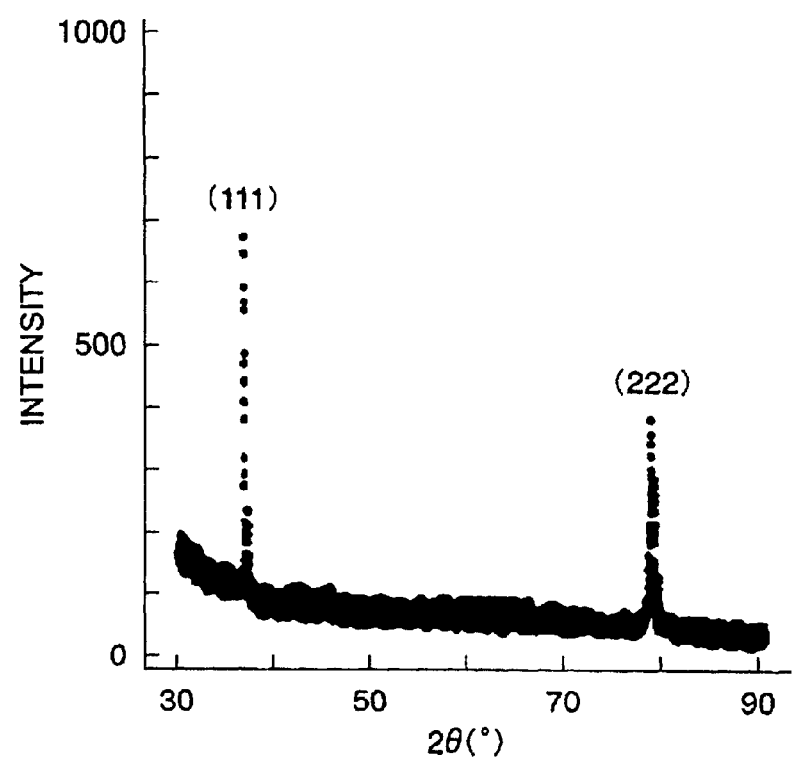
FIG. 18 shows the result of X-ray diffraction in case where the partial pressure ratio of hydrogen and oxygen is 0.2 in the atmosphere within the chamber.

FIG. 17 shows the result of X-ray diffraction in case where the partial pressure ratio of hydrogen and oxygen is 0.5 in the atmosphere within the chamber, and FIG. 18 shows the result of X-ray diffraction in case where the partial pressure ratio of hydrogen and oxygen is 0.2 in the atmosphere within the chamber.

Even in any case, according to the X-ray diffraction (XRD: X-Ray Diffraction), the protective film has (111) orientation. It has been widely known that (111) orientation is the orientation of the MgO single crystal, and has the great second electron emission coefficient and the excellent sputtering resistance. Accordingly, the film having (111) orientation is suitable for the protective film of the PDP.

Further, in order to obtain the partial pressure ratio of hydrogen and oxygen of 0.3 to 1, the partial pressure ratio may be controlled with introducing oxygen gas and vapor or hydrogen gas into the chamber. In case of introducing the vapor, because the vapor is dissociated into hydrogen and oxygen by the plasma produced by the electron beam, it becomes possible to control the partial pressure ratio.

Further, when forming the protective film, the parts such as a carrier to convey the substrate between the inside and the outside of the film forming apparatus are used. A MgO film having, for example, 0.1 to 1 mm in thickness may be previously formed on the surface of the parts. Since the MgO film formed on the parts absorbs water when it is sent to outside of the chamber, when the MgO film comes into the chamber together with the substrate thereafter, it can disperse vapor in the inside of the chamber. Accordingly, with inflow of the oxygen gas from the outside, the partial pressure ratio of hydrogen and oxygen in the chamber can be controlled.

What is claimed is:

1. A protective film protecting a dielectric layer of a plasma display panel from discharge, containing metallic oxide, and a volume resistivity of said protective film being $3.5 \times 10^{11}$ Ω·cm or more.

2. A protective film protecting a dielectric layer of a plasma display panel from discharge containing metallic oxide, and a volume resistivity of said protective film being $3.5 \times 10^{11}$ Ω·cm or more, containing 3 hydrogen atoms or more when the number of total atoms in said protective film is defined as 100.

3. A protective film protecting a dielectric layer of a plasma display panel from discharge, containing metallic oxide and hydrogen, the number of hydrogen atoms being 3 or more when the number of total atoms in said protective film is defined as 100.

4. The protective film according to claim 1, wherein said metallic oxide is MgO.

5. The protective film according to claim 3, wherein said metallic oxide is MgO.

6. The protective film according to claim 4, wherein a peak of light emission intensity of light emitting center in 510 to 560 nm in a cathode luminescence is higher than that of light emission intensity of light emitting center in 280 to 440 nm or 680 to 760 nm.

7. The protective film according to claim 5, wherein a peak of light emission intensity of light emitting center in 510 to 560 nm in a cathode luminescence is higher than that of light emission intensity of light emitting center in 280 to 440 nm or 680 to 760 nm.

8. The protective film according to claim 6, wherein the number of said hydrogen atoms is at least the number of total deficits of total oxygen atoms and metal atoms.

9. The protective film according to claim 7, wherein the number of said hydrogen atoms is at least the number of total deficits of total oxygen atoms and metal atoms.

10. The protective film according to claim 1, wherein said protective film is formed by means of performing a heat treatment in atmosphere including hydrogen in excited or ionized state.

11. The protective film according to claim 3, wherein said protective film is formed by means of performing a heat treatment in atmosphere including hydrogen in excited or ionized state.

12. The protective film according to claim 1, wherein a surface roughness Ra of said protective film is 5 nm or more.

13. The protective film according to claim 3, wherein a surface roughness Ra of said protective film is 5 nm or more.

14. The protective film according to claim 1, wherein said protective film has (111) orientation.

15. The protective film according to claim 3, wherein said protective film has (111) orientation.

16. A plasma display panel, comprising
a protective film according to claim 1.

17. A plasma display panel, comprising
a protective film according to claim 3.

* * * * *